United States Patent [19]
Burton

[11] Patent Number: 5,925,466
[45] Date of Patent: Jul. 20, 1999

[54] PROCESS FOR APPLYING AN APPEARANCE ENHANCING PROTECTIVE POLYURETHANE LINING FOR TRUCK BEDS AND PRODUCT PRODUCED BY SAME

[76] Inventor: Jorge G. Burton, 2550 Garnsey St., Santa Ana, Calif. 92707

[21] Appl. No.: 08/844,450

[22] Filed: Apr. 18, 1997

[51] Int. Cl.⁶ .............................. B32B 27/00; B32B 27/40
[52] U.S. Cl. .................... 428/423.1; 156/94; 206/335; 264/36.18; 264/36.22; 427/142; 427/318; 427/327; 427/388.2
[58] Field of Search .................................. 427/140, 142, 427/273, 388.1, 388.2, 388.4, 388.5, 328, 327; 156/94; 246/335; 264/36.18, 36.22; 428/423.1

[56] References Cited

U.S. PATENT DOCUMENTS

| | | |
|---|---|---|
| 3,894,165 | 7/1975 | Bates . |
| 4,087,296 | 5/1978 | Hooker . |
| 4,661,532 | 4/1987 | Moria . |
| 4,756,337 | 7/1988 | Settineri ................................. 156/53 X |
| 4,948,443 | 8/1990 | Speer ................................. 427/140 X |
| 5,216,093 | 6/1993 | Hayashi . |
| 5,221,707 | 6/1993 | Chihara . |
| 5,317,076 | 5/1994 | Primeaux . |
| 5,415,499 | 5/1995 | Hyde-Smith et al. .............. 427/373 X |
| 5,693,714 | 12/1997 | Bauman et al. ..................... 525/232 X |
| 5,716,443 | 2/1998 | Kijima . |

*Primary Examiner*—Michael Lusignan
*Attorney, Agent, or Firm*—Patent Law Firm, P.C.; Peter Jon Gluck; Intellepharm, Inc.

[57] ABSTRACT

A process for applying a polyurethane elastomeric lining for truck beds and product produced by same, including a kit, enabling do-it yourself application by a truck owner of a protective coating of the inner surfaces which define a truck bed, which coating is effective for preserving the durational utility of the involved interior walls without the need for professional assistance or specialized equipment.

20 Claims, 1 Drawing Sheet

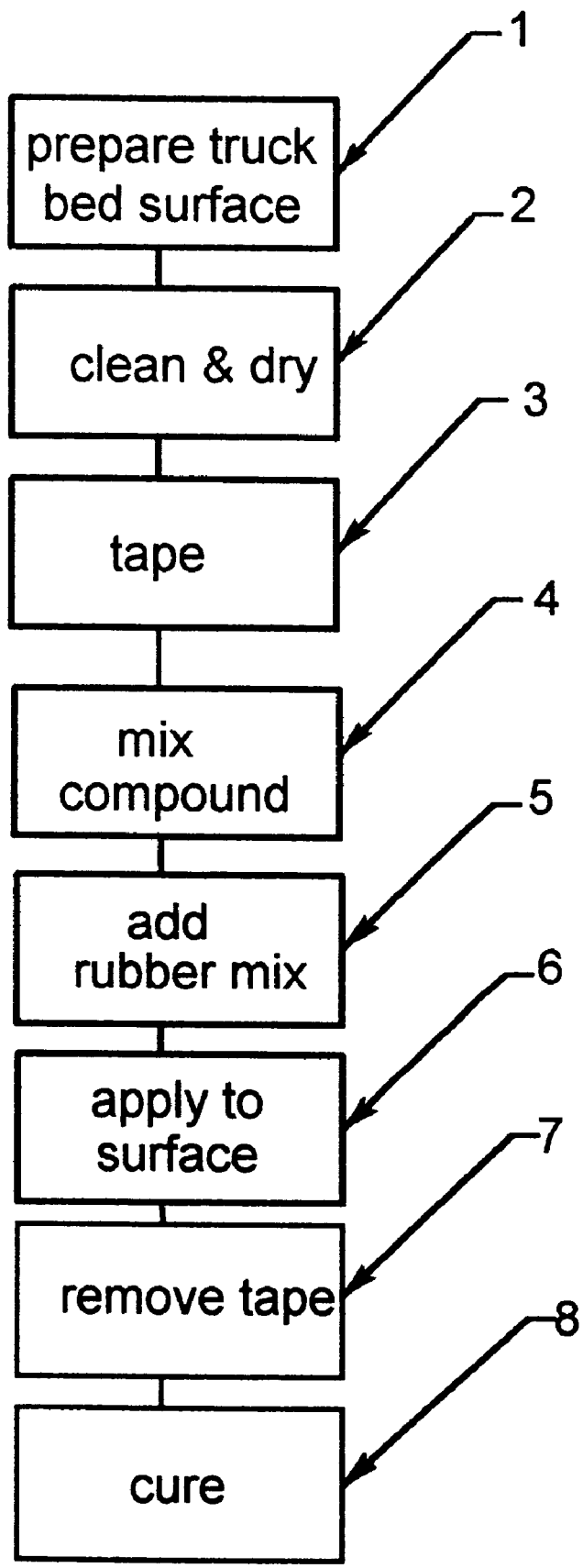

PROCESS FOR APPLYING AN APPEARANCE ENHANCING PROTECTIVE POLYURETHANE LINING FOR TRUCK BEDS AND PRODUCT PRODUCED BY SAME

BACKGROUND OF THE INVENTION

The present invention relates to methods for self-applying appearance enhancing protective coatings over the inner surfaces of truck beds, and related applications in other fields of endeavor. In particular, the present invention relates to a process for applying a permanent protective polyurethane elastomeric coating, which protective coating is capable of being mixed and then brushed or troweled by a user over the interior walls of a truck bed without any prior expertise, background or training.

Conventional systems for applying protective elastomeric coatings to the inner surfaces of truck beds have been plagued by several longstanding problems. Likewise, there is lacking in the art a suitable 'do-it-yourself' means to apply protective urethane coatings. Prominent among truck users is a particular need to protect the inner painted surfaces of the bed walls that are commonly associated with various types of pickup trucks. For example, any exposed inner wall surface of a truck bed which is painted is prone to scratches, peeling and the like damage by contact with things being transported. Rust is often a direct result of violation of the integrity of such inner wall paint surfaces in combination with the natural forces of weather. Once corrosion gains a foothold, degradation of the entire truck bed soon follows.

Further, conventional truck "bed liner" coating systems traditionally require installation by an expert, or are prohibitively expensive or otherwise cumbersome. The only known type of do-it-yourself product is made up of a pre-formed bed liner which is designed to be dropped into the bed of a truck in a pre-assembled state. This known liner is prohibitively expensive, in addition to requiring installation assistance from at least several persons.

Likewise, attempts at using different lining materials have not adequately addressed the longstanding needs ameliorated by the instant teachings. For example, wooden truck bed liners are subject to damage and have durational life spans requiring that they be replaced at least several times during the lifetime of the average truck.

Conventional chemical treatments utilizing urethane and epoxy materials and mixtures are likewise known as available for use protecting various substrates. However, as applied to the problem solved by the present invention, attempts within the prior art have heretodate been subject to the same constraints enumerated above, namely, they are ineffectual generally in that they require frequent replacements and experts for installation. The teachings of the present invention have ameliorated this longstanding problem, and as explained below—offer an uncomplicated chemical solution which substantially improves over the prior art. An explanation of technical rudiments of same is provided hereafter.

By way of background, attention is called to the following United States Letters Patents which have each been examined during the course of the present invention and found to be technically distinguishable from the instant teachings, as claimed subject matter created by the present inventor which is respectfully submitted to be new, novel and unobvious within the definition prescribed by statute:

U.S. Pat. Nos. 5,436,302; 5,317,076; 5,221,707; 5,216,093; 5,096,992; 4,933,416; 4,636,546; 4,661,532; 4,511,626; 4,087,296; and 3,894,165.

The majority of these prior art references are readily distinguishable in that they merely define the state of the art in urethane technology, namely each showing that it is know n to combine the MDI (diphenylmethane diisocyanates or isocyanate-functional derivatives) chemical family with polyols to produce elastomeric compositions. This is done by introducing MDI to a hydroxyl group and forming a urethane molecule. Such specific applications have grown out of the original disclosures relating to the initial development of urethane from the 1940's in Germany.

Conventional use of urethane for substrate protection is disclosed by the prior art which was examined, and found to be readily distinguishable from the instant teachings. This is shown, for example, by U.S. Pat. No. 4,087,296 issued to Thomas Hooker disclosing a method for applying membrane-covered rigid foam to building surfaces, such as a roof.

U.S. Pat. No. 4,636,546 issued to Yen-Yau H. Chao disclosing a process for preparing modified polymer emulsion adhesives useful, for example, in bonding expanded vinyl. Likewise, U.S. Pat. No. 4,933,416 which issued to Herbert R. Gillis, et al. disclosed general apsects of the properties and usages of polyisocyanate compositions.

U.S. Pat. Nos. 5,221,707; 5,317,076; 4,511,626; and 5,436,302 each relate to general aspects of elastomeric compositions with DMI and combination of same with fillers. It is noted that nothing among these disclosures either suggests the solution proffered by the instant teachings, or the particular fillers used by the present invention to achieve its novel objectives.

Finally, U.S. Pat. No. 5,216,093 issued to Shuichi Hayashi revealed a low-temperature curing epoxy resin composition, which demonstrates only that compounds such as the present invention are known to be curable at ambient temperature and pressure.

However, U.S. Pat. No. 4,661,532 ("the '532 patent") which issued to Morin on Apr. 28, 1987 and disclosed a COAL TAR CONTAINING FOAMING URETHANE COMPOSITION AND A METHOD FOR REPAIRING DEFECTS IN STRUCTURAL COMPONENTS, enumerates an additional problem solved by the teachings of the present invention. In specific, the '532 patent demonstrates that the "recycle of used structural components" (Col. 1, line 22) is appropriate for combination with a plurality of different chemical materials, including urethanes. However, the '532 patent limits itself to the generation of 'two package urethane compositions' and a method using same to repair structural members having surface defects. Likewise, its nature as a foaming urethane composition differentiates it from the instant teachings.

In essence, the teachings of the present invention have wedded the solution to these two technically distinct problems in generating both a process for coating the bed liner of a truck and an economically efficient means for utilizing a recycled tire by-product. A brief technical synopsis sets forth a rudimentary background for the underlying mechanism for the novel teachings offered herein for consideration.

A plastic is defined as any organic material with the ability to flow into a desired shape when heat and pressure are applied, and to retain the shape when they are withdrawn. A plastic is made up principally of a binder, together with plasticizers, fillers, pigments, and other additives. The binder gives a plastic its main characteristics and usually its name. Thus, for example, polyvinyl chloride is both the name of a binder and the name of a plastic into which it is made. Binders may be natural materials, e.g. cellulose derivatives, casein or milk protein. But more commonly binders are synthetic resins. In either case, the binder materials consist of very long chainlike molecules called polymers. Cellulose derivatives are made from cellulose, a naturally occurring polymer; casein is also a naturally occurring polymer.

Plasticizers are added to a binder to increase flexibility and toughness. Fillers, such as carbon black, are added to improve particular properties, e.g. hardness or resistance to shock. Pigments are used to impart various colors. Plethoric combinations of both pigments and fillers are known to those skilled in the art, and it is possible to impart a multiplicity of desired finishes or affects utilizing same. Likewise, many combinations of the properties of hardness, durability, elasticity, and resistance to heat, cold and acid, can be obtained in a plastic by way of manipulation of requisite parameters.

Generally, there are two type of plastics: thermosets, which cannot be resoftened after being subjected to heat and pressure; and thermoplasts, which can be repeatedly softened and remolded by heat and pressure. Plastics, also called synthetic resins are polymerized, or built up, from small simple molecules called monomers. When beat and pressure are applied to a thermoplastic binder, these chainlike molecules slide past each other giving the material "plasticity". By contrast, when heat and pressure are initially applied to a thermosetting binder, the molecular chains become joined or "crosslinked", thus preventing any slippage if heat and pressure are reapplied.

Thermosets are usually supplied as partially polymerized or as monomer-polymer mixtures. Cross linking is achieved during fabrication using chemicals, heat or radiation; this process is called curing or vulcanization. Important thermosets include phenol-formaldehyde, epoxy, diallyl phthalate, polyester, urea-formaldehyde, and melamine-formaldehyde, among others.

Plastic articles are commonly manufactured from thermoset plastics in which desired shapes are fashioned by molding. The monomer or partially polymerized mixture is treated with a curing agent and may be placed in a mold to harden. Reinforcement means can be introduced during this process, which is used for designs with intricate shapes and great variations in wall thickness. Among the plastics used for making plastic articles are epoxy resins, polypropylene, polyolefins, polyethylene, vinyl plastics, polycarbonates, polyacrylics, polyvinyl chloride polystyrene, phenolics, ureas, melamines, polyesters, silicones, rubbers, and polyurethanes. Likewise, rubbers as polymers of isoprene are effective for creating application specific uses and resultant product with desired inherent properties.

Plastics, including rubbers admixed with same, may be used as such, or may be reinforced by other reinforcing materials. Similarly, a wide variety of materials are made by combining fiberglass with plastics. These materials, which are rust proof, are molded into the shape required or pressed into flat sheets, as discussed within the context of the truck-bed liners requiring expert installation.

According to the instant teachings, the painted surface of a truck, or deck, or other application is protected from rust or other damage. This polyurethane elastomeric coating incorporates ground rubber pellets, enabling it to overcome the principal drawbacks of the prior art, and making it trowelable, brushable or easily applied generally by a single user. Both of these distinct, but significant concerns is ameliorated by the present invention as developed below and defined by the claims below. Likewise, it is noted that the composition of the present invention is readily differentiable from the only other do-it-yourself means for coating a substrate which is applied by a spray nozzle on a bottle. As discussed hereinafter, the teachings of the present invention require that a consistency be imparted to the compound through the addition of ground rubber—which precludes such spray nozzle applications.

It is respectfully submitted that any U.S. Letters Patent references offered herein for consideration, but not distinguished in detail, merely define the state of the art or show the type of systems which have been used to alternately address those issues ameliorated by the teachings of the present invention. Accordingly, further discussions of these references has been omitted at this time due to the fact that they are readily distinguishable from the instant teachings to one of skill in the art.

OBJECTS AND SUMMARY OF THE INVENTION

Accordingly, the present invention is particularly designed to provide a simple means for applying a polyurethane elastomeric coating to the inner surfaces defining a truck bed, or the like surfaces including construction decks, roofs, retaining wall, marine applications, trailers, secondary containment situations, floorboards, vehicle interiors, sound sytem applications, and outdoor applications, so as to establish a protective coating that will prevent scratching, chipping, and other drawbacks of the prior art, including concomitant rusting and eventual degradation of the surface being treated.

An additionally important object of the present invention is to provide a simplified do-it-yourself means for applying a unique trowelable polyurethane elastomeric coating.

Another object of the present invention is to enable a single user to apply a unique trowelable polyurethane elastomeric coating effective for coating the interior walls of a truck bed without the use of expensive specialized equipment.

Yet a further object of the present invention is to enable a single user to apply a unique trowelable polyurethane elastomeric coating effective for coating the interior walls of a truck bed without the need for assistance from a professional intaller or rust proofing professional.

Yet a still further object of the present invention is to provide a kit allowing a single user to form and apply a trowelable polyurethane elastomeric coating containing ground rubber having a size range of from about 40 to about 50 mesh capable or ready mixing with a paddle and facile application to a selected desired surface.

Briefly stated there is provided a process for applying a polyurethane elastomeric lining for truck beds and the like surfaces including construction decks, roofs, retaining wall, marine applications, trailers, secondary containment situations, floorboards, vehicle interiors, sound sytem applications, and outdoor applications and product produced by same, including a kit, enabling do-it yourself application by a truck owner of a protective coating of the inner surfaces which define a truck bed, which coating is effective for preserving the durational utility of the involved interior walls without the need for professional assistance or specialized equipment.

According to a feature of the present invention there is provided, a process for the one person generation of a polyurethane elastomeric coating, which comprises, in combination, the steps of; providing a surface defined by an outer layer; preparing said surface; cleaning and drying said surface; taping said surface; mixing a chemical admixture consisting essentially of about one half of each of at least one member of the MDI family selected from the group consisting of diphenylmethane diisocyanate and isocyanate functional derivatives, a polyol having primary hydroxyl groups; adding predetermined aliquots of ground rubber and carbon black needed to impart a required consistency, applying same to said outer surface, and, curing same to create a protective coating upon said outer surface.

According to an additional feature of the present invention there is provided a product produced by the aformentioned process, which product is effective for preventing corrosion of a coated surface.

According to yet a still further feature of the present invention there is provided a kit, effective for enabling a single user to apply a do-it-yourself elastomeric coating, which comprises, in combination; a water cured prepolymer mixed compound, means for containing same, means for transferring same to a surface to be coated, which means are effective for applying same across said surface to be coated, including local topographic aspects of same.

In sum, the above, and other objects, features and objectives of the present invention, shall become apparent with the following description whether in conjunction with the accompanying drawings, in which like reference numerical designating indicators designate the same elements.

BRIEF EXPLANATION OF THE DRAWINGS

FIG. 1 is a flow chart illustrating steps according to a process as defined by a preferred embodiment of the present invention.

DETAILED DESCRIPTION OF THE PREFERRED EMBODIMENTS

The present inventor has discovered that there is a paucity of disclosure in the do-it-yourself after-market for pick-up truck bed liners. In offering the present invention for consideration, it has been discovered that it is possible to provide a polyurethane elastomeric lining which, owing to the addition of ground rubber, is trowelable to effectively coat the inner surfaces that define a truck bed, or any other surface required to be made corrosion and rust-proofed, including construction decks, roofs, retaining walls, marine applications, trailers, secondary containment situations, floorboards, vehicle interiors, sound sytem applications, in addition to outdoor applications.

The addition of, for example, ground rubber (which may be recovered, or recycled from tires) within a pellet size ranging of from about 30 to about 50 mesh enables a single user to completely seal a desired surface, for example, a truck bed. A mechanism, akin to classical steric inhibition or hindrance in reverse, forces the compound of the present invention into hard to seal nooks and crannies, and allows a user to effectively coat a desired surface, exemplified in a preferred embodiment offered herein for consideration which is a truck bed.

Applicant's compound may either be a premixed prepolymer MDI (diphenylmethane diisocyanates or isocyanate functional derivatives) compound or a two-component trowelable grade elastomeric thermoplastic polyurethane system is designed for processing by hand mixture. Either of the premixed prepolymer MDI compound of the two component mixture of same having MDI (diphenylmethane diisocyanates or isocyanate functional derivatives)/polyol containing primary hydroxyl groups mixture is used to produce an elastomeric composition mixture which changes from a liquid to a trowelable paste and then to a solid. Owing to its slow cure material nature, its excellent wetting and trowelability, the compound of the present invention is particularly appropriate for applications requiring good surface hardness.

According to a preferred embodiment of the present invention, the surface to be coated may be a painted surface which defines the "bed" of a truck. Such a metal substrate coated by an original paint layer is subject to the pitfalls discussed above in that once the integrity of the original painted surface is breached large scale corrosion is soon to follow. Accordingly, the present invention has been field tested in precisely such a setting and been found to perform in exemplary fashion.

Descriptions of this preferred embodiment are offered herein for consideration as illustrative of workings of the present invention, but not in any way limiting of same. Usages in settings as varied as marine applications, trailers used for transporting livestock and myriad industrial settings are contemplated within the scope of the present invention.

Referring now to FIG. 1, steps of a process for according to the present invention are presented in flow-chart form. Step 1 involves preparing a truck bed surface. This may be done, for example, by using a SCOTCH-BRITE® type of material disposed upon the whole inner surface defining the interior of the truck bed. This is needed to remove the oxidized paint and rust, which would prevent an effective (rust- and corrosion-preventing) seal with the intended truck bed.

The second enumerated step, 2, involves cleaning and drying the truck bed surface to enable it to be taped off, defining the borders of the inner surfaces of same prior to application of the compound of the present invention. Step 3 is the actual taping of the whole inner surface defining the interior of the truck bed to be coated. Those of normal skill in the art will readily understand the masking-type of application of this tape, and it limits the area covered by the coating of the present invention.

Step 4 involve mixing the compound, for at least about two minutes. This involves a prepolymer water cured MDI (diphenymethane diisocyanates or isocyante-functional derivatives) and a polyol containing primary hydroxyl groups compound which is stirred with any known or conventional means for stirring.

Likewise, according to an alternate embodiment of the present invention the compound initially consists essentially of two components, the MDI (diphenymethane diisocyanates or isocyante-functional derivatives) and a polyol containing primary hydroxyl groups briefly with a paddle. According to preferred embodiments of the present invention, the polyol component itself should be blended with a paddle for about ten seconds prior to combination with the MDI.

Step 5 involves addition of the rubber mix, comprising at least one material selected from the group consisting of carbon black and rubber, in an amount constituting from about 10 to about 18 weight percent of the mixed compound and it has been discoverd that in preferred embodiments of the present invention that ground rubber (which may be recovered, or recycled from tires) within a pellet size ranging of from about 30 to about 50 mesh, mixed proportionately with the addition of filler carbon black (a fine carbon powder made by burning hydrocarbons insufficient air) in a ratio of 1:1 for a total weight percentage of about 15.

Step 6 involves applying the mixed elasotmer compound to the inner surface of the truck bed. This is done with the use of a hand held means for trowelling, including any one of those known as trowels, and the like hand tools. Likewise, the applying step further includes spreading the mixed elasotmer compound along the inner surface of the truck bed with the use of the trowel such that the mixed elasotmer compound becomes lodged in the troughs, corrugations and other surface features of the surface.

The teachings of the present invention are facilitated by the dispersed rubber particles which assist in making the elastomer trowelable. As discussed above, a mechanism, akin to classical steric inhibition or hindrance in reverse, forces the compound of the present invention into hard to seal nooks and crannies, and allows a user to effectively coat a desired truck bed.

Step 7 involves removing the tape applied according to step 3 of the preferred embodiment of a process according to the present invention. Step 8 completes the process with a cured protective coating resulting from do-it-yourself application of the trowelable elastomer according to preferred embodiments of the present invention.

On this basis, the instant invention should be recognized as constituting progress in science and the useful arts, as providing a do-it-yourself process for coating the bed of a truck and solving the problems enumerated above.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the product can have other shapes, or could make use of other fabrics or plastic coatings. Thus the scope of the invention should be determined by the appended claims and their legal equivalents, rather than by the examples given.

What is claimed is:

1. A process for the one person generation of a polyurethane elastomeric coating, which comprises, in combination, the steps of:

providing a surface defined by an outer layer;

preparing said outer layer having said surface;

cleaning and drying said surface;

taping said surface;

mixing a prepolymer precursor of a polyurethane elastomeric compound;

adding predetermined aliquots of filler needed to impart a required consistency; and applying same said prepared surface; for, curing same to create an appearance enhancing protective coating upon said outer surface.

2. Process according to claim 1, wherein said preparing step further comprises:

removing rust and other surface matter from said outer surface.

3. Process according to claim 2, wherein said cleaning and drying step further comprises eliminating moisture and and particulate residue from said outer surface.

4. Process according to claim 3, wherein said taping step further comprises:

defining the peripheral edges of said outer surface to be coated, by applying strips of tape along said peripheral edges.

5. Process according to claim 4, wherein said polyurethane elastomeric compound is generated from a one component water cured preploymer compound, and further comprises a multiplicity of units of filler to impart a desired consistency.

6. Process according to claim 5, wherein said one component water cured preploymer compound consists essentially of at least one member of the MDI family selected from the group consisting of diphenylmethane diisocyanate and isocyanate functional derivatives, and a polyol having primary hydroxyl groups.

7. Process according to claim 4, wherein said polyurethane elastomeric compound is a chemical admixture consisting essentially of about one half of each of:

at least one member of the MDI family selected from the group consisting of diphenylmethane diisocyanate and isocyanate functional derivatives, and a polyol having primary hydroxyl groups.

8. Process, according to claim 6, said filler further comprising at least one material selected from the group consisting of:

a) carbon black in an amount consisting from about 10 weight percent to about 18 weight percent of the mixed compound;

b) rubber in an amount consisting from about 10 weight percent to about 18 weight percent of the mixed compound; and, c) pigment.

9. Process, according to claim 8, wherein:

d) said rubber is ground to a range of between about 30 to about 50 mesh;

e) said surface defines a truck bed; and f) said appearance enhancing protective coating defines a protective bedliner.

10. Product, produced by the process of claim 9, wherein said protective bedliner is capable of being applied by one person without assistance of another user.

11. Product, produced by the process of claim 9, wherein said protective bedliner changes from a liquid to a trowelable paste and then to a solid.

12. Product, produced by the process of claim 9, wherein said protective bedliner is waterproof.

13. Product, produced by the process of claim 9, wherein said protective bedliner is molded to each contour of the surface covered.

14. Product, produced by the process of claim 6, wherein:

a) said surface defines a truck bed; and b) said appearance enhancing protective coating defines a protective bedliner.

15. Product, produced by the process of claim 7.

16. An article of manufacture, comprising a Kit effective for enabling a user to apply a do-it-yourself trowelable elastomeric coating, comprising, in combination:

a) a water cured prepolymer compound;

b) predetermined aliquots of rubber pellets;

c) filler in an amount up to about 18 weight per cent of said compound;

d) means for mixing said compound; and, e) means for applying said compound upon a surface to be coated such that said compound becomes disposed evenly upon said surface to be coated.

17. Article, according to claim 16, wherein said water cured prepolymer compound is capable of being mixed into a polyurethane elastomeric compound, and said filler is carbon black in an amount constituting from about 10 to about 18 weight percent of the mixed compound; and wherein said rubber is ground to a range of between about 30 to about 50 mesh.

18. Article, according to claim 17, wherein said means for applying comprises at least one of a trowel, a brush, and the like means for spreading.

19. Article, according to claim 18, wherein said means for mixing further comprises:

a container; and at least one of a paddle and a stirring rod.

20. Article, according to claim 19, further comprising instructions.

* * * * *